(12) United States Patent
Stevens

(10) Patent No.: US 8,856,390 B1
(45) Date of Patent: Oct. 7, 2014

(54) USING DEVICE CONTROL FIELD TO IMPLEMENT NON-DISRUPTIVE NOTIFICATION OF AN ATA DEVICE

(75) Inventor: Curtis E. Stevens, Irvine, CA (US)

(73) Assignee: Western Digital Technologies, Inc., Irvine, CA (US)

(*) Notice: Subject to any disclaimer, the term of this patent is extended or adjusted under 35 U.S.C. 154(b) by 1519 days.

(21) Appl. No.: 12/058,601

(22) Filed: Mar. 28, 2008

(51) Int. Cl.
*G06F 3/00* (2006.01)

(52) U.S. Cl.
USPC ............................................... 710/7; 710/17

(58) Field of Classification Search
USPC ................................................................ 710/7
See application file for complete search history.

(56) References Cited

U.S. PATENT DOCUMENTS

| | | | |
|---|---|---|---|
| 4,703,420 A | 10/1987 | Irwin | |
| 5,077,733 A | 12/1991 | Whipple | |
| 5,276,662 A | 1/1994 | Shaver, Jr. et al. | |
| 5,465,338 A | 11/1995 | Clay | |
| 5,590,299 A | 12/1996 | Bennett | |
| 5,860,089 A | 1/1999 | Ishii | |
| 6,618,788 B1 | 9/2003 | Jacobs | |
| 6,697,885 B1 | 2/2004 | Goodfellow | |
| 6,948,082 B2* | 9/2005 | Gschwind et al. | 713/320 |
| 6,948,113 B1 | 9/2005 | Shaver | |
| 7,130,932 B1 | 10/2006 | Ghaffari | |
| 7,165,124 B2 | 1/2007 | Fujita et al. | |
| 7,827,320 B1 | 11/2010 | Stevens | |
| 2003/0236953 A1 | 12/2003 | Grieff et al. | |
| 2004/0010625 A1 | 1/2004 | Lo | |
| 2004/0190554 A1 | 9/2004 | Galloway | |
| 2005/0027894 A1 | 2/2005 | Ayyavu | |
| 2005/0027913 A1 | 2/2005 | Boecker | |
| 2005/0080842 A1 | 4/2005 | Takeuchi | |
| 2005/0102468 A1 | 5/2005 | Delaney et al. | |
| 2005/0122991 A1* | 6/2005 | Golasky et al. | 370/467 |
| 2005/0186832 A1 | 8/2005 | Nemazie | |
| 2006/0031612 A1 | 2/2006 | Bashford et al. | |
| 2006/0075164 A1* | 4/2006 | Ooi | 710/58 |
| 2006/0248535 A1 | 11/2006 | Grover | |
| 2007/0118768 A1 | 5/2007 | Wolford | |
| 2007/0189619 A1 | 8/2007 | Liu et al. | |
| 2007/0226385 A1* | 9/2007 | Liu et al. | 710/62 |
| 2007/0260756 A1 | 11/2007 | Tseng et al. | |
| 2008/0005398 A1* | 1/2008 | Huffman | 710/39 |

OTHER PUBLICATIONS

Serial ATA: High Speed Serialized AT Attachment, Revision 1.0a, Jan. 7, 2003, pp. 1-311.
Serial ATA International Organization: Serial ATA Revision 2.6, High Speed Serialized AT Attachment, Feb. 15, 2007, 600 pages.
American National Standard for Information Technology, AT Attachment with Packet Interface 7, vol. 3, Serial Transport Protocols and Physical Interconnect (ATA/ATAPI-7 V3), ANSI INCITS 397-2005 (vol. 3), 305 pages.

(Continued)

*Primary Examiner* — Ellias Mamo

(57) ABSTRACT

An Advanced Technology Attachment (ATA) device is disclosed for communicating with a host. The ATA device receives a command from the host, and while the ATA device is busy processing the command, the ATA device receives intra-command data from the host in at least one bits 3, 4, 5, and 6 in a device control field. In one embodiment the ATA device is a parallel ATA device, and the device control field is part an ATA task file. In another embodiment, the ATA device is a serial ATA device, and the device control field is part of a host to device Frame Information Structure (FIS).

25 Claims, 7 Drawing Sheets

(56) References Cited

OTHER PUBLICATIONS

American National Standard for Information Technology, AT Attachment with Packet Interface 7, vol. 2, Parallel Transport Protocols and Physical Interconnect (ATA/ATAPI-7 V2), ANSI INCITS 397-2005 (vol. 2), 250 pages.

American National Standard for Information Technology, AT Attachment with Packet Interface 7, vol. 1, Regster Delivered Command Set, Logical Register Set (ATA/ATAPI-7 V1), ANSI INCITS 397-2005 (Vol. 1), 393 pages.

Office Action dated Dec. 28, 2009 from U.S. Appl. No. 12/058,572, 18 pages.

Notice of Allowance dated Jun. 24, 2010 from U.S. Appl. No. 12/058,572, 14 pages.

* cited by examiner

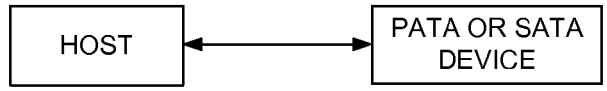

FIG. 1A

(Prior Art)

ATA TASK FILE

| | A2 | A1 | A0 | Read | Write |
|---|---|---|---|---|---|
| | 0 | 0 | 0 | Data Port | |
| | 0 | 0 | 1 | Error | Features |
| | 0 | 1 | 0 | Sector Count | |
| | 0 | 1 | 1 | Sector Number | |
| CS = 0 | 1 | 0 | 0 | Cylinder Low | |
| | 1 | 0 | 1 | Cylinder High | |
| | 1 | 1 | 0 | Device / Head | |
| | 1 | 1 | 1 | Status | Command |
| CS = 1 | 1 | 1 | 0 | Alternate Status | Device Control |

FIG. 1B

(Prior Art)

REGISTER - HOST TO DEVICE FIS

| | | | | |
|---|---|---|---|---|
| 0 | Features | Command / C R R Reserved (0) | | FIS Type (27h) |
| 1 | Dev / Head | Cyl High | Cyl Low | Sector Number |
| 2 | Features (exp) | Cyl High (exp) | Cyl Low (exp) | Sector Num (exp) |
| 3 | Control | Reserved (0) | Sector Count (exp) | Sector Count |
| 4 | Reserved (0) | Reserved (0) | Reserved (0) | Reserved (0) |

FIG. 1C

(Prior Art)

| 7 | 6 | 5 | 4 | 3 | 2 | 1 | 0 |
|---|---|---|---|---|---|---|---|
| HOB | Reserved | Reserved | Reserved | Reserved | SRST | nIEN | 0 |

| 7 | 6 | 5 | 4 | 3 | 2 | 1 | 0 |
|---|---|---|---|---|---|---|---|
| HOB | A | B | C | D | SRST | nIEN | 0 |

A = VIBRATION
B = HIGH TEMP.
C = LOW POWER
D = SECURITY BREACH

FIG. 4A

| 7 | 6 | 5 | 4 | 3 | 2 | 1 | 0 |
|---|---|---|---|---|---|---|---|
| HOB | S/C | F | F | F | SRST | nIEN | 0 |

FIG. 4B

| 7 | 6 | 5 | 4 | 3 | 2 | 1 | 0 |
|---|---|---|---|---|---|---|---|
| S/C | 1 | F | F | F | F | F | F |

FIG. 4C

| 7 | 6 | 5 | 4 | 3 | 2 | 1 | 0 |
|---|---|---|---|---|---|---|---|
| A | B | C | D | E | F | G | 1 |

FIG. 4D

| 7 | 6 | 5 | 4 | 3 | 2 | 1 | 0 |
|---|---|---|---|---|---|---|---|
| A | B | C | S/C | F | F | F | 1 |

FIG. 4E

USING DEVICE CONTROL FIELD TO IMPLEMENT NON-DISRUPTIVE NOTIFICATION OF AN ATA DEVICE

BACKGROUND

Advanced Technology Attachment (ATA) devices, such as disk drives and Flash drives, typically communicate with a host using the parallel ATA (PATA) or serial ATA (SATA) protocol. With both protocols, it may be desirable for the host to communicate with the ATA device while the device is in the middle of processing a current data access command, such as a read command. For example, the host may transmit a large read command to the ATA device which requires the ATA device to transmit the requested data in multiple blocks (e.g., 8k blocks). While receiving the blocks of data, it may be desirable for the host to communicate with the ATA device without having to abort the current read command. For example, if the host detects a threat to the ATA device, such as a free fall condition, it would be desirable for the host to command the ATA device to take appropriate protective action (e.g., park the heads in a disk drive) until the threat has passed. Once the threat has passed, it would be desirable for the host to command the ATA device to continue processing the current data access command (e.g., continue transmitting data of a current read command).

BRIEF DESCRIPTION OF THE DRAWINGS

FIG. 1A shows a prior art ATA device (parallel or serial) for communicating with a host.

FIG. 1B shows a prior art ATA task file including a device control field.

FIG. 1C shows a prior art host to device Frame Information Structure (FIS) comprising a device control field.

FIG. 4A shows a format of a device control field according to an embodiment of the present invention wherein each of bits 3-6 identifies particular intra-command data for the ATA device.

FIG. 4B shows a format of a device control field according to an embodiment of the present invention wherein setting bit 6 indicates a condition is present, and setting bits 3-5 identifies the condition.

FIG. 4C shows a format of a device control field according to an embodiment of the present invention wherein setting bit 6 enables the use of bits 0, 1, 2, and 7 to transmit the intra-command data to the ATA device.

FIG. 4D shows a format of a device control field according to an embodiment of the present invention wherein setting bit 0 enables the use of bits 1, 2, and 7 to transmit the intra-command data to the ATA device.

FIG. 4E shows a format of a device control field according to an embodiment of the present invention wherein setting bit 0 configures bits 5-7 into condition identifiers, and bits 1-4 as condition and/or action identifiers.

DETAILED DESCRIPTION OF EMBODIMENTS OF THE INVENTION

FIG. 1A shows a host communicating with an ATA device, such as a disk drive (fixed or removable media), Flash drive, optical drive (CD ROM, DVD, Blue Ray), etc. In one embodiment, the ATA device is a parallel ATA device which communicates with the host over a parallel data bus, and in another embodiment, the ATA device is a serial ATA device which communicates with the host over a serial bus. FIG. 1B shows a format of an ATA task file which was defined as part of the original ATA protocol for communicating with a parallel ATA device. The address lines A0, A1, A2, and CS correspond to address lines of the parallel ATA bus, where 16 bits of corresponding data are transferred over data lines of the parallel ATA bus. The 8 bit device control field (FIG. 3) of the ATA task file is manipulated effectively as a register by configuring the address lines and data bus as shown in FIG. 1B.

With serial ATA, the ATA task file is converted into a Frame Information Structure (FIS) which is transmitted over the serial bus essentially as a packet of information. To manipulate the device control field, a host-to-device FIS having a FIS Type of 27h and Control field (FIG. 3) having the device control data is transmitted to the serial ATA device. In addition, the C bit of the FIS is cleared in order for the serial ATA device to recognize the Control field as device control data.

Figures 2, 3:
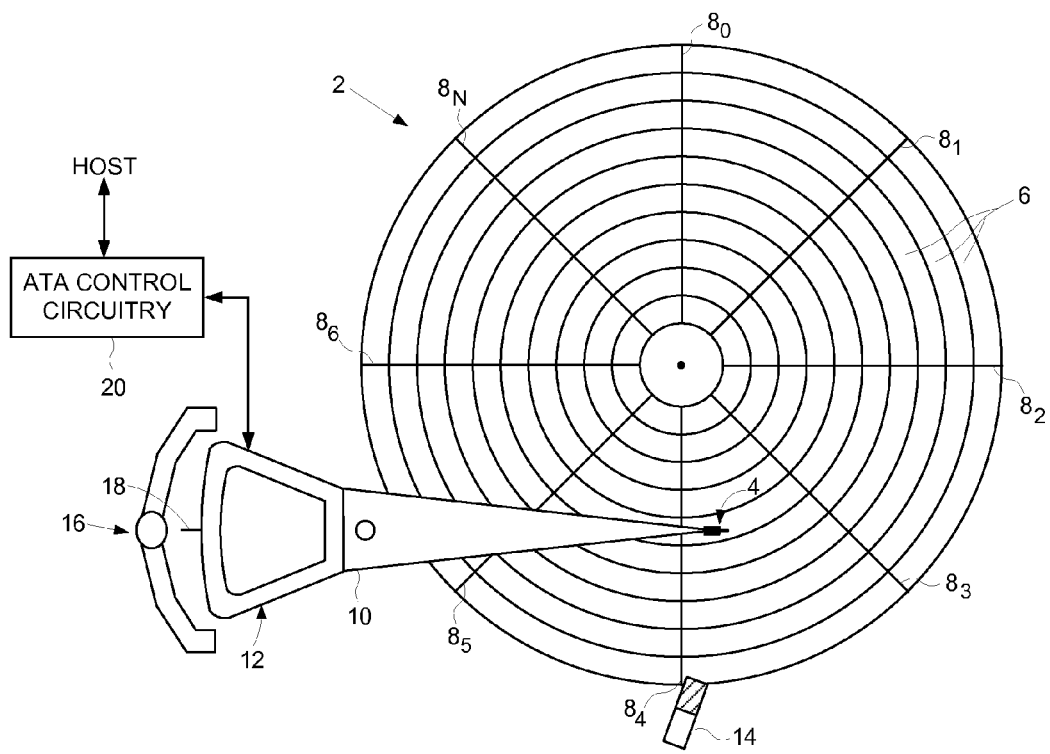
FIG. 2 shows an ATA device in the form of a disk drive comprising ATA control circuitry.
FIG. 3 shows a prior art format of a device control field wherein bits 3-6 are reserved.

FIG. 2 shows one embodiment of a serial ATA device that is a disk drive including a disk 2, and a head 4 actuated over the disk 2. The disk 2 comprises a plurality of tracks 6 defined by embedded servo sectors $8_0$-$8_N$. The head 4 is connected to a distal end of an actuator arm 10 which is rotated about a pivot by a voice coil motor. The voice coil motor is comprised of a voice coil 12 coupled to the base of the actuator arm 10 which interacts with permanent magnets of a yoke (not shown). During certain modes of operation, such as when the disk drive is about to power down, the actuator arm 10 is rotated in order to unload the actuator arm 10 onto a ramp 14 near the outer periphery of the disk 2. A crash stop 16 limits the stroke of the actuator arm 10 by limiting the movement of a tang 18 coupled to the base of the actuator arm 10. ATA control circuitry 20 communicates with a host using a suitable ATA communication protocol (parallel or serial).

When the disk drive is processing a command received from a host, such as a read command, it may be desirable for the host to transmit intra-command data to the disk drive without interrupting the current command. For example, if the disk drive is part of a portable computer, it may be desirable for the host to notify the disk drive that the portable device may have been dropped (in free fall) so that the disk drive can take protective action (such as unloading the actuator arm 10 onto the ramp 14) to prevent the vibration due to impact from damaging the disk 2 or the head 4. However, with the prior art ATA protocol, after the ATA device sets the BSY bit to notify the host it is busy processing a current command, the host typically cannot send intra-command data to the ATA device (for example, to warn a disk drive of a free fall condition).

FIG. 4A shows an embodiment of the present invention wherein when the ATA device is busy processing a current command, the host configures (sets or clears) at least one of bits 3, 4, 5, and 6 in the device control field (FIG. 3) to transmit intra-command data to the ATA device. In the example of FIG. 4A, each of bits 3, 4, 5, and 6 correspond to a particular condition, such as a vibration condition, a high temperature condition, a low power condition (e.g., battery power level of the host), or a security breach. The ATA device may respond to each condition in any suitable manner, such as unloading the actuator arm in response to a vibration condition, adjusting a seek profile in response to a high temperature condition or a low power condition, or enable security features (e.g., disable the ATA device). In one embodiment, the security condition identifies a particular security threat to the ATA device, such as if a Universal Serial Bus (USB) device has been connected to the host. A USB device may be considered a security threat since a user may attempt to copy data from the ATA device to the USB device.

The intra-command data may be transmitted to the ATA device in the device control field using any suitable protocol. FIGS. 4B-4E illustrate various alternative protocols for the intra-command data, wherein in FIG. 4B, bits 3, 4, and 5 identify 8 different types of intra-command data (e.g., conditions) and bit 6 indicates whether the condition is present (the bit is set) or no longer present (the bit is cleared). FIG. 4C illustrates an embodiment wherein when bit 6 is set, bits 0-5 are used for intra-command data (6 bit data word), and bit 7 indicates whether the condition is present (the bit is set) or the condition is no longer present (the bit is cleared). When bit 6 is cleared, then bits 0-2 and bit 7 represent their standard meaning as defined in the ATA protocol. FIG. 4D illustrates an embodiment wherein when bit 0 is set, it enables the use of bits 1-7 for communicating a condition to the ATA device. For example, setting one of the bits indicates the condition is present, and clearing the bit indicates the condition is no longer present. FIG. 4E shows an embodiment wherein a hybrid format is employed such that when bit 0 is set, bits 5-7 identify the presence/absence of a condition, bits 1-3 identify control data (3 bit data word) that identify a condition and bit 4 indicating whether the condition is present or cleared. When bit 0 is cleared in the embodiments of FIGS. 4D and 4E, then bits 0-2 and bit 7 represent their standard meaning as defined by the ATA protocol.

Figure 5A:
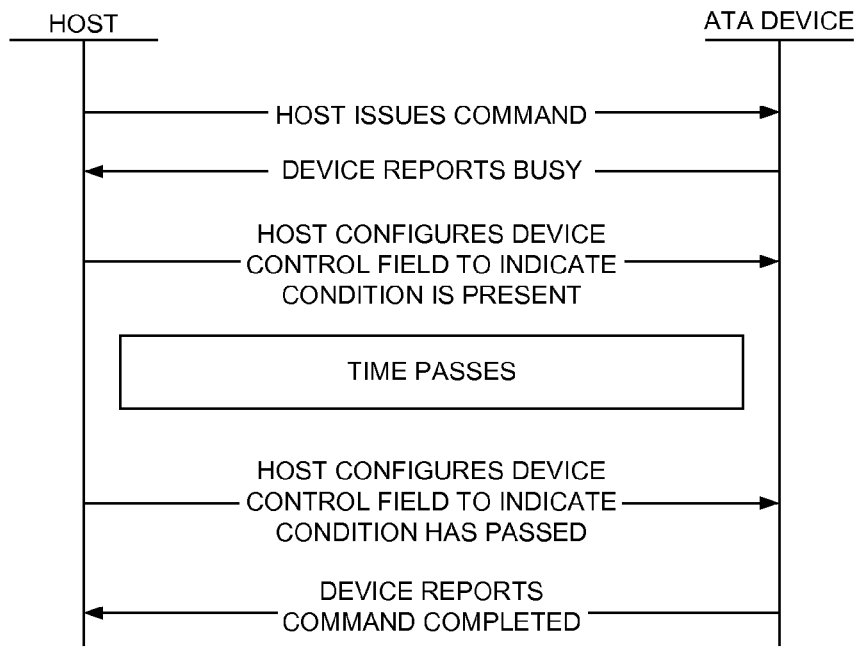
FIG. 5A shows an embodiment of the present invention wherein the host configures the device control field in order to notify the ATA device that a condition is present while the ATA device is busy processing a current command.
Figure 5B:
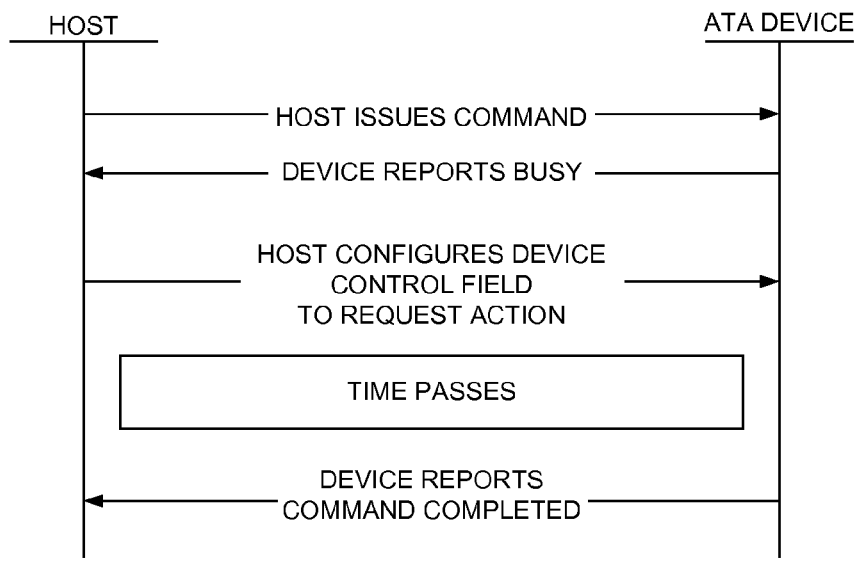
FIG. 5B shows an embodiment of the present invention wherein the host configures the device control field in order to request the ATA device perform an action while the ATA device is busy processing a current command.

In an embodiment shown in FIG. 5A, after the ATA device sets the BSY bit to notify the host that it is busy processing a current command, the host configures the device control field (e.g., sets one of bits 3, 4, 5, and 6) in order to identify that a condition is present, and then clears the corresponding bit when the condition is no longer present. For example, the host may set the vibration bit (bit 6) when a free fall condition is detected, and then clear the vibration bit once the free fall condition is no longer detected. The intra-command data may also comprise an action request transmitted by the host as illustrated in FIG. 5B, such as a request to unload the actuator arm onto the ramp, bypass the cache, write verify the current command, or enter an idle mode, execute a background scan, or execute a test procedure immediately after the current command finishes executing.

An ATA device may implement one or more of the protocols described herein, and in one embodiment, the ATA device comprises a feature that enables the host to discover which protocol the ATA device implements. For example, in one embodiment the host may transmit an IDENTIFY DEVICE command to the ATA device. The ATA device responds to the IDENTIFY DEVICE command by returning a block of data (e.g., 512 bytes) which identifies the features implemented by the ATA device, including the protocol implemented for receiving intra-command data in the device control field.

Figure 6:
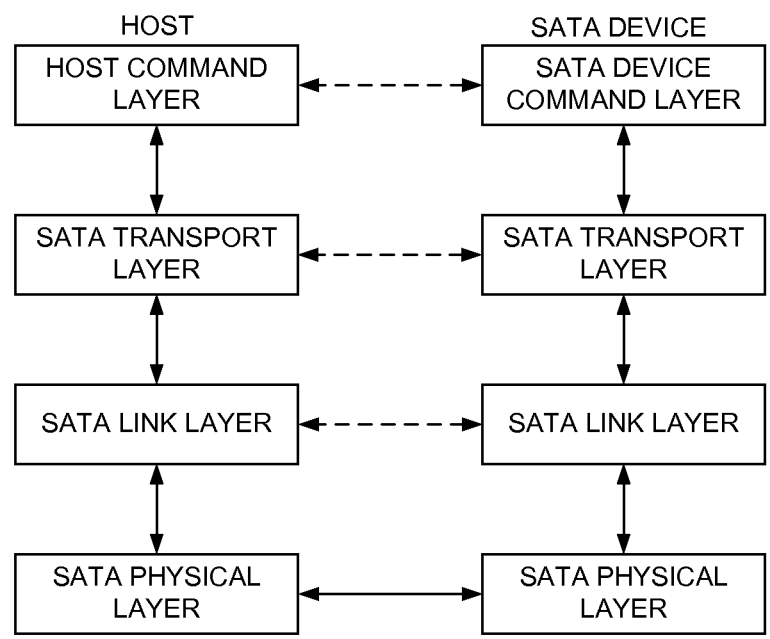
FIG. 6 shows prior art serial ATA communication layers implemented by both the host and a serial ATA device.

FIG. 6 shows the serial ATA communication layers including the Command layer (or Application layer), the Transport layer, the Link layer, and the Physical layer. The Control layer interacts with the Transport layer through a register interface that is equivalent to a traditional Parallel ATA host adapter. A shadow register block is defined that is both compatible with Parallel ATA and anticipated future extensions. Software is thus backward compatible with Parallel ATA devices. The Transport layer handles the packing and unpacking of ATA and ATAPI information into Frame Information Structures (FISs). The Transport layer also manages the FIFO or buffer memory for controlling data flow. The Link layer transmits and receives frames, transmits primitives based on control signals from the Transport layer, and receives primitives from the Physical layer which are converted to control signals to the Transport layer. The Physical layer incorporates serializer/deserializer, provides out of band (OOB) signaling, and handles power-on sequencing and speed negotiation. Device status feedback is also provided to the Link layer.

Figure 7A:
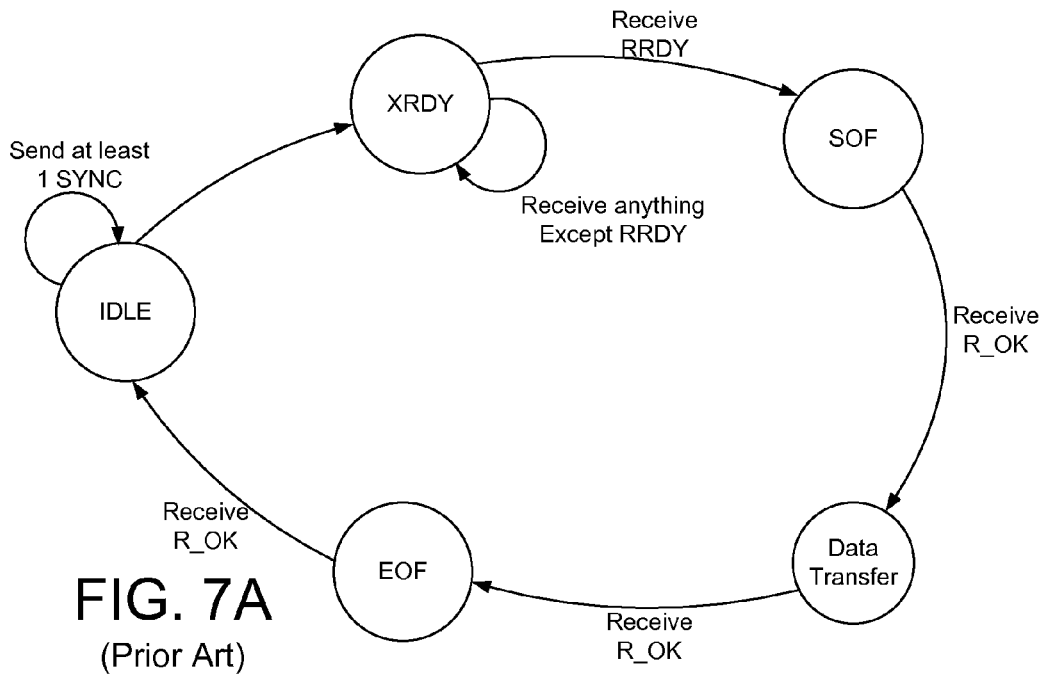
FIG. 7A shows a prior art state transition diagram implemented by the ATA device for transmitting data to the host (during a read operation) wherein the host is not able to send a XRDY to the ATA device after it enters the XRDY state.

FIG. 7A shows a prior art state transition diagram implemented by the conventional serial ATA Link layer when transmitting multiple data FISs to the host in response to a read command. The ATA device enters the XRDY state and waits for the host to transmit a RRDY primitive indicating that the host is ready to receive more data. The ATA device then enters the SOF state to transfer a start of frame (SOF) primitive to the host. After receiving an R_OK primitive from the host, the ATA device transmits a data FIS to the host, and after receiving an R_OK primitive from the host, the ATA device enters the EOF state to transfer and end of frame (EOF) primitive to the host. After receiving an R_OK primitive from the host, the ATA device enters an IDLE state where it sends at least one SYNC primitive to the host to maintain synchronization, and then transitions back to the XRDY state where the process repeats for the next block of data for the current command.

While the ATA device is in the XRDY state waiting to receive a RRDY primitive from the host, the ATA device will ignore a XRDY primitive received from the host (a request to transmit data to the ATA device) since the ATA device is already busy processing the current read command. Therefore, the host typically cannot send intra-command data to the SATA device (for example, to command a disk drive to unload an actuator arm 10 onto a ramp 14 to avoid damage due to a free fall event).

Figure 7B:
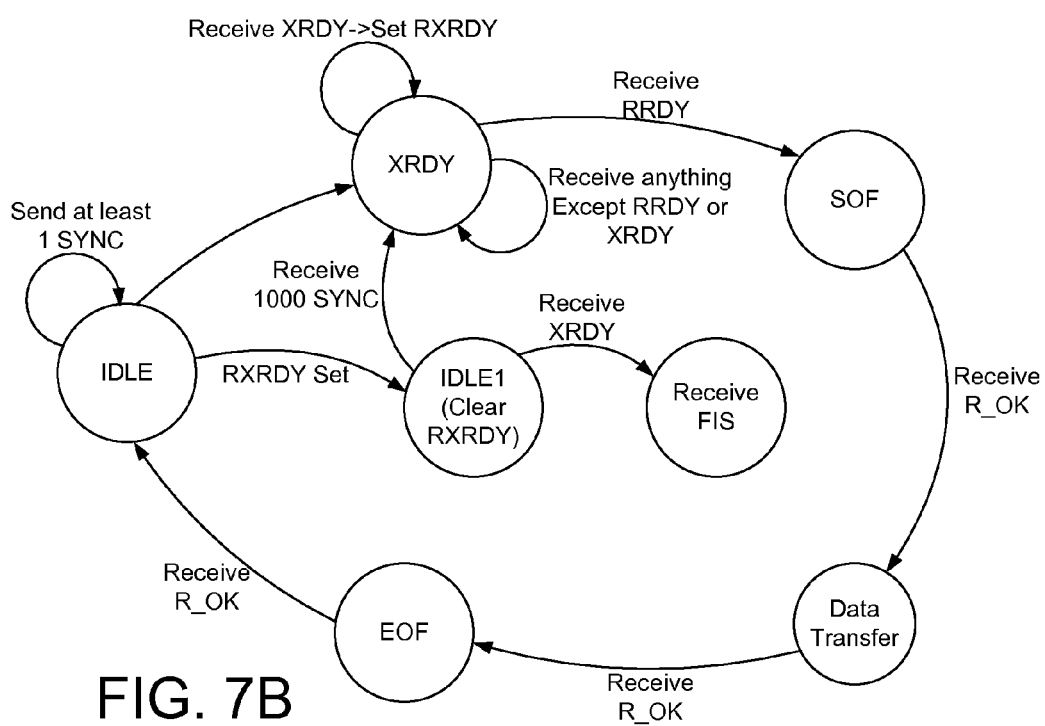
FIG. 7B shows a state transition diagram implemented by the ATA device according to an embodiment of the present invention wherein the ATA device sets a RXRDY flag if a XRDY is received from the host while in the XRDY state which enables the host to transmit a FIS to the ATA device after entering the IDLE state.

FIG. 7B shows a state transition according to an embodiment of the present invention when transmitting multiple data FISs to the host in response to a read command. The state transition diagram of FIG. 7B differs from the state transition diagram of FIG. 7A in that when the ATA device is in the XRDY state and receives a XRDY primitive from the host, the ATA device sets a RXRDY flag to identify the collision. Than after the ATA device sends the next FIS to the host (in response to the RRDY primitive), when the ATA device enters the IDLE state it checks whether the RXRDY flag was set. If so, the ATA device enters a secondary idle state (IDLE1), clears the RXRDY flag, and waits for the host to transmit another XRDY primitive. If the ATA device receives a XRDY primitive while in the IDLE1 state, the ATA device transitions into a receive FIS state and receives and processes a FIS from the host containing intra-command data (e.g., a vibration detected condition transmitted in the device control field of a host-to-device FIS). If the host does not transmit an XRDY to the ATA device, the ATA device transitions into the XRDY state in order to continue processing the current read command. In one embodiment, the ATA device waits for a predetermined interval while in the IDLE1 state, and in another embodiment, the ATA device waits to receive a predetermined number of SYNC primitives from the host before transitioning back into the XRDY state.

Although the state transition diagram of FIG. 7B illustrates a read command, the embodiments of the present invention apply to any command executed by the ATA device, such as a write command or a feature set command, or any other command wherein the ATA device may be busy such that host would not typically be able to transmit intra-command data to the ATA device. In addition, the intra-command data transmitted by the host may comprise any suitable data, wherein in one embodiment the intra-command data comprises an interim access command (read or write command) that is executed prior to completing the current access command.

Figure 8:
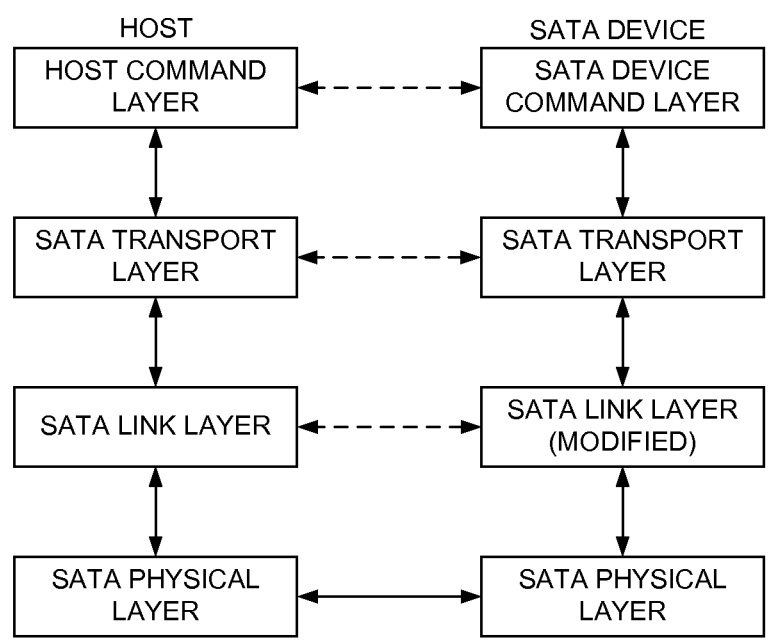
FIG. 8 shows an embodiment of the present invention wherein the link layer of a serial ATA device is modified to implement the state transition diagram of FIG. 7B.

FIG. 8 shows an embodiment of the present invention wherein the Link layer of a serial ATA device is modified in order to implement the intra-command data processing, such as the state transition diagram shown in FIG. 7B. The Link layer is typically responsible for processing the primitives received from the host, including the XRDY primitive. Therefore, in one embodiment the Link layer is modified to set the RXRDY flag while in a suitable state, such as the XRDY state of FIG. 7B, and then to check the status of the RXRDY flag while in a suitable state, such as the IDLE state of FIG. 7B.

The control circuitry for implementing the embodiments of the present invention within an ATA device may comprise any suitable circuitry, such as any suitable integrated circuit or circuits, a microprocessor executing instructions of a control program, etc. In the embodiment where the control circuitry is implemented within a disk drive, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC).

In one embodiment, the control circuitry comprises a microprocessor executing instructions, the instructions being operable to cause the microprocessor to implement the embodiments described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk of a disk drive and read into a volatile semiconductor memory when the disk drive is powered on.

What is claimed is:

1. A method of a host communicating with an Advanced Technology Attachment (ATA) device, the ATA device comprising a device control field, the method comprising:
transmitting a command to the ATA device; and
while the ATA device is busy processing the command, configuring at least one of bits 3, 4, 5, and 6 in the device control field to transmit intra-command data to the ATA device.

2. The method as recited in claim 1, wherein configuring at least one of bits 3, 4, 5, and 6 in the device control field to transmit intra-command data to the ATA device is done while a BSY bit is set indicating that the ATA device is busy processing the command.

3. The method as recited in claim 1, wherein the device control field is part of an ATA task file.

4. The method as recited in claim 1, wherein:
the device control field is part of a host-to-device Frame Information Structure (FIS); and
the FIS comprises a FIS type of 27h.

5. The method as recited in claim 1, wherein the ATA device comprises a disk drive.

6. An Advanced Technology Attachment (ATA) device comprising control circuitry configured to:
receive a command from a host; and
while processing the command, receive intra-command data from the host in at least one of bits 3, 4, 5, and 6 in a device control field.

7. The ATA device as recited in claim 6, wherein the control circuitry is further configured to set a BSY bit while processing the command, wherein the BSY bit is set when the intra-command data is received.

8. The ATA device as recited in claim 6, wherein the device control field is part of an ATA task file.

9. The ATA device as recited in claim 6, wherein:
the device control field is part of a host-to-device Frame Information Structure (FIS); and
the FIS comprises a FIS type of 27h.

10. The ATA device as recited in claim 6, wherein intra-command data is received from the host as a single bit of the device control field.

11. The ATA device as recited in claim 6, wherein intra-command data is received from the host as multiple bits of the device control field.

12. The ATA device as recited in claim 11, wherein a first one of the bits indicates a condition is present and at least two other of the bits identify the condition.

13. The ATA device as recited in claim 11, wherein a first one of the bits is toggled to indicate a condition is no longer present and at least two other of the bits identify the condition.

14. The ATA device as recited in claim 11, wherein setting one of the bits enables the use of bits 0, 1, 2, and 7 to transmit the intra-command data.

15. The ATA device as recited in claim 11, wherein bit 0 is set to enable the use of bits 1, 2, and 7 to transmit the intra-command data to the ATA device.

16. The ATA device as recited in claim 6, wherein the control circuitry is further configured to:
receive an identify device command from the host; and
transmit support data to the host identifying a protocol for the ATA device receiving the intra-command data.

17. The ATA device as recited in claim 6, wherein the intra-command data identifies an environmental condition.

18. The ATA device as recited in claim 17, wherein the intra-command data identifies a free fall condition.

19. The ATA device as recited in claim 16, wherein the intra-command data identifies temperature condition.

20. The ATA device as recited in claim 6, wherein the intra-command data identifies a security condition.

21. The ATA device as recited in claim 20, wherein the security condition indicates a universal serial bus device has been connected to the host.

22. The ATA device as recited in claim 6, wherein the intra-command data configures a power mode of the ATA device.

23. The ATA device as recited in claim 6, wherein the intra-command data configures a background mode of the ATA device.

24. An Advanced Technology Attachment (ATA) device comprising control circuitry configured to:
   receive a command from a host; and
   while processing the command, receive intra-command data from the host in at least one of bits 2-7 in a device control field when bit 0 of the device control field is set.

25. A system comprising a host coupled to an Advanced Technology Attachment (ATA) device, wherein: the host is configured to transmit a command to the ATA device; and
   while the ATA device is busy processing the command, the ATA device is configured to receive intra-command data from the host in at least one of bits 3, 4, 5, and 6 in a device control field.

* * * * *